(12) United States Patent
Kudo (10) Patent No.: US 6,795,662 B2
(45) Date of Patent: Sep. 21, 2004

(54) IMAGE FORMING DEVICE WITH INDEPENDENT CONTROL PANEL

(75) Inventor: Toshihiko Kudo, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/165,303

(22) Filed: Jun. 10, 2002

(65) Prior Publication Data

US 2002/0191980 A1 Dec. 19, 2002

(30) Foreign Application Priority Data

Jun. 19, 2001 (JP) .................................... 2001-184946
Jan. 21, 2002 (JP) .................................... 2002-012056

(51) Int. Cl.[7] ............................................. G03G 15/00
(52) U.S. Cl. .................................... 399/81; 399/107
(58) Field of Search .......................... 399/1, 81, 107; D14/371; 345/175, 173

(56) References Cited

U.S. PATENT DOCUMENTS 6,259,866 B1 * 7/2001 Kabumoto et al. ............ 399/1
6,314,254 B1 * 11/2001 Wakahara .................... 399/81

FOREIGN PATENT DOCUMENTS

JP 9-6185 1/1997
JP 11-119498 4/1999

* cited by examiner

*Primary Examiner*—Hoang Ngo
(74) *Attorney, Agent, or Firm*—Fitzpatrick, Cella, Harper & Scinto (57) ABSTRACT

An image-forming device includes a control panel having a display function. The control panel is supported by a support member which is provided either on an original-sheet discharge-tray or on a main body and the original-sheet discharge-tray of the image-forming device. The control panel is separate from the main body and positioned toward a front side of the original-sheet discharge-tray.

21 Claims, 10 Drawing Sheets

IMAGE FORMING DEVICE WITH INDEPENDENT CONTROL PANEL

BACKGROUND OF THE INVENTION

1. Field of the Invention

The present invention relates to image-forming devices including an independent control panel which is separate from a main body of the image-forming device. In particular, the present invention relates to a copying device including an independent control panel having a display function, arranged so as to minimize the size of the copying device, and particularly to minimize the floor space required for installation of the copying device, including the main body itself and an operational area of the copying device.

2. Description of the Related Art

Figure 7:
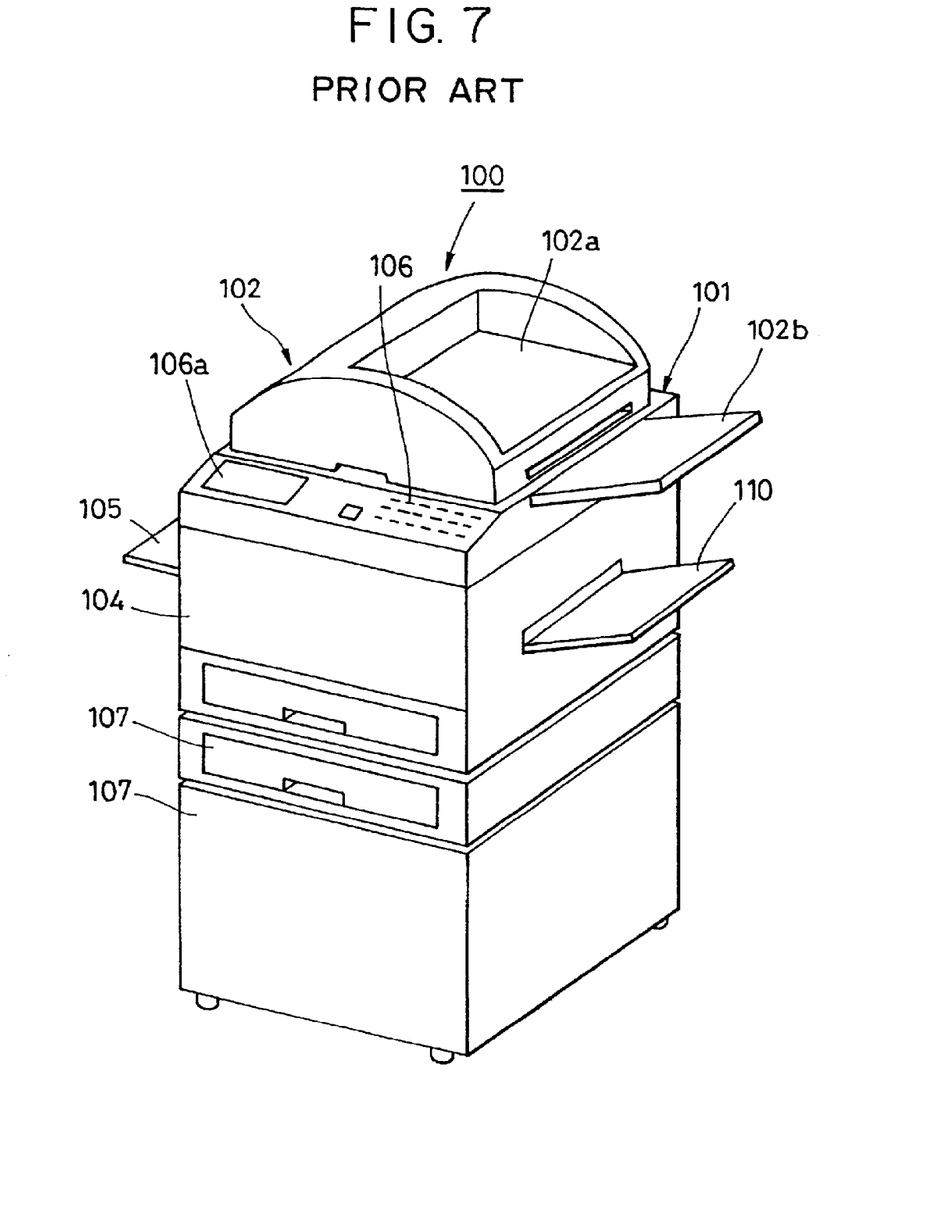
FIG. 7 is a perspective view of a known copying device.
Figure 8:
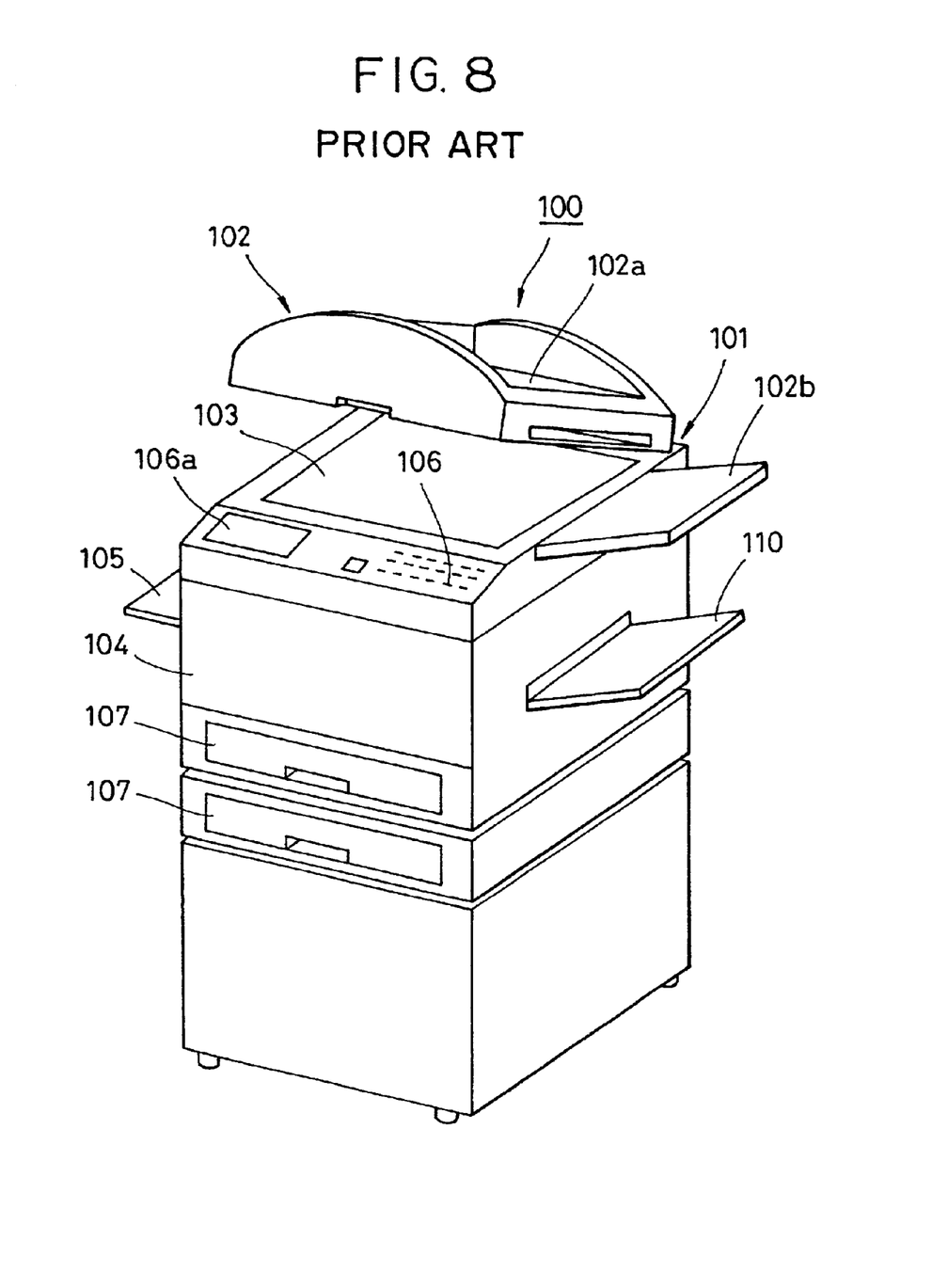
FIG. 8 is another perspective view of the known copying device shown in FIG. 7, showing an automatic document-feeder that is partially open.

A copying device, as a known image-forming device, is shown in FIGS. 7 and 8. Other known image-forming devices include printers, facsimiles, combinations of printers and facsimiles, and the like.

A copying device 100 shown in FIGS. 7 and 8 is provided with an automatic document-feeder 102 at an upper part of a main body 101 of the copying device 100. The automatic document-feeder 102 automatically feeds original sheets to an image reader 103, as shown in FIG. 8. The automatic document-feeder 102 includes a mounting part 102a for setting the original sheets thereon. The image reader 103 optically reads the original sheets or books that are placed upon the image reader 103. The image reader 103 is disposed at the uppermost part of the main body 101, which opposes a lower face of the automatic document-feeder 102.

The automatic document-feeder 102 can pivot on hinges disposed at the rear side thereof. This allows the automatic document-feeder 102 to be maintained open at any desired angle with respect to the main body 101, so that an original sheet or a book can be set on the image reader 103 for reading.

An original-sheet discharge-tray 102b for stacking original sheets which have been read and discharged by the automatic document-feeder 102 is provided at the right side of the upper part of the main body 101. The main body 101 is provided with a display 106a at the front side of the automatic document-feeder 102 and at the upper part of the main body 101.

A sheet-supply tray 105 for stacking sheets for printing, when the sheets are manually supplied to the main body 101 by an operator, protrudes from the left side of the main body 101.

When the operator operates the copying device 100 by using a control panel 106, the image reader 103 reads data from an original sheet or a book, an imaging unit (not shown) provided in the main body 101 transfers an image data corresponding to the read data to a sheet which was supplied from a sheet cassette 107 or the sheet-supply tray 105, and the sheet is discharged to a sheet-discharge tray 110.

The control panel 106 of the known copying device 100 is positioned at the front side of the upper part of the main body 101, that is, between the automatic document-feeder 102 and the operator. The control panel 106 preferably is positioned toward the front side of the copying device 100, because if it is disposed toward the rear side of the copying device 100, the control panel 106 will interfere with the easy opening and closing of the automatic document-feeder 102 or setting of the original sheets or books on the image reader 103.

Therefore, the control panel 106 conventionally has been positioned toward the front side. Since the space provided to install the control panel 106 is limited at the front side, however, the size of the control panel 106 has had to be reduced.

In recent years, however, the size of the control panel 106 of known copying devices has increased. Currently, a large liquid crystal monitor including a touch panel often is provided in order to cope with the trend toward multiple functionality of the copying device and improved maneuverability thereof. As a result, an enlarged control panel 106 displaces the automatic document-feeder 102 and the image reader 103 toward the rear side of the main body 101, whereby the original sheets or books are not easily set on the image reader 103 and the size of the copying device 100 is increased.

In particular, it may be particularly difficult for an operator in a wheelchair, who operates the copying device 100 from a position lower than that of an operator who operates the same while standing, to set original sheets or books on the image reader 103 and handle the automatic document-feeder 102.

Moreover, it is difficult for an operator in a wheelchair to view a control panel 106, which is substantially horizontal to the upper face of the main body 101 (the control panel 106 has poor visibility for the operator in a wheelchair).

The visibility of the control panel 106 may be improved by providing an operation surface of the control panel 106 that is substantially vertical, and by providing the control panel 106 toward the front side of the main body 101 of the copying device 100.

However, when the control panel 106 is disposed toward the front side of the main body 101, the control panel 106 and a supporting member for the control panel 106 may interfere with the opening and closing of the automatic document-feeder 102 and with the opening and closing of a cover 104 of the main body 101 of the copying device 100. However, if the control panel 106 is disposed toward the rear side of the main body 101 of the copying device 100, remote from the operator, operability and maneuverability of the copying device 100 is reduced.

Figure 9:
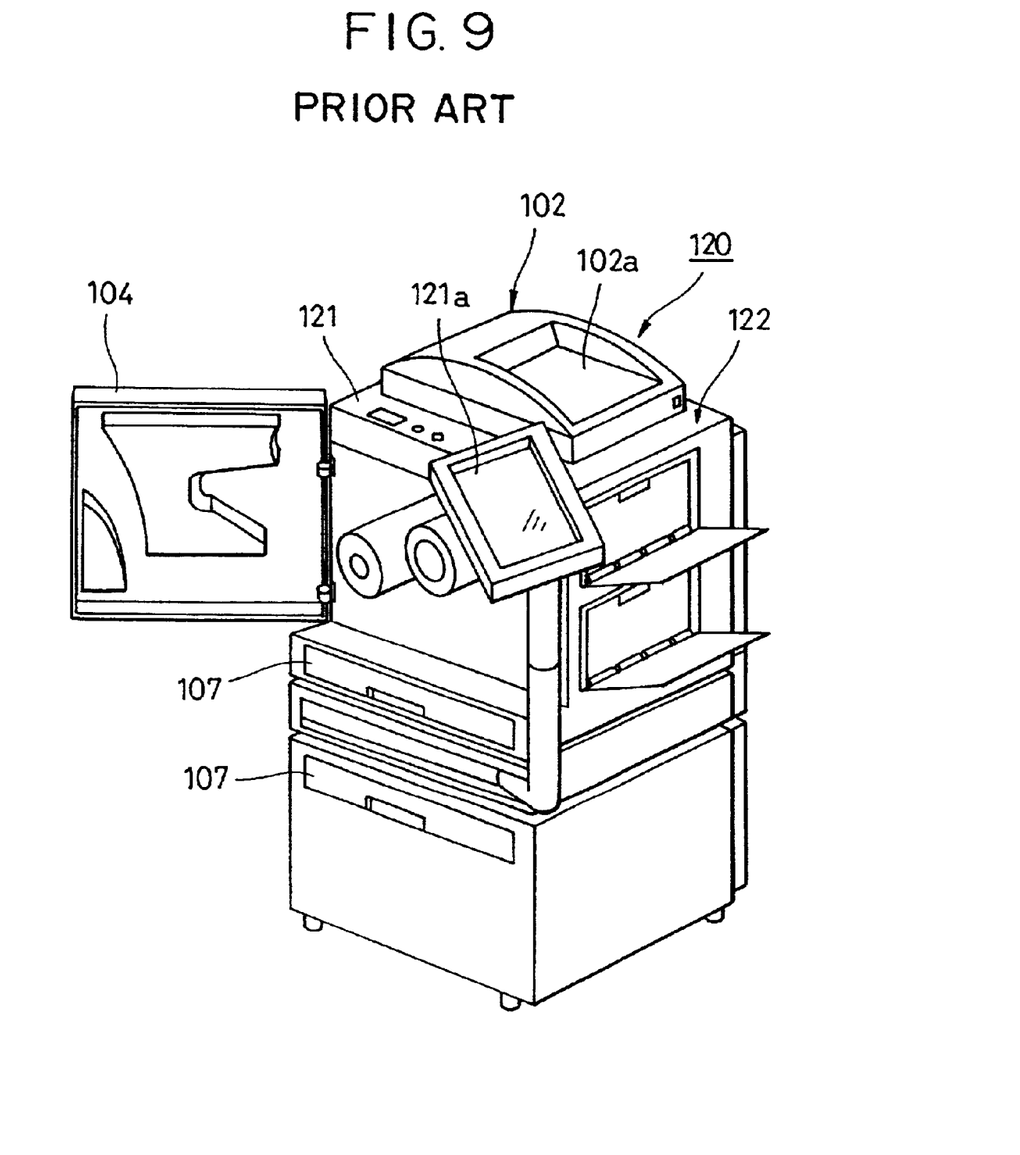
FIG. 9 is a perspective view of another known copying device.

Copying devices that attempt to overcome the above drawbacks are disclosed in, for example, Japanese Patent Laid-Open Nos. 9-6185 and 11-119498. The copying device disclosed in Japanese Patent Laid-Open No. 9-6185 is provided with a control panel 121 having a display 121a, as shown in FIG. 9, which is movable to a position appropriate for operation. The copying device disclosed in Japanese Patent Laid-Open No. 11-119498 is provided with an inclined control panel 131, as shown in FIG. 10, of which the angle of inclination is variable.

Figure 10:
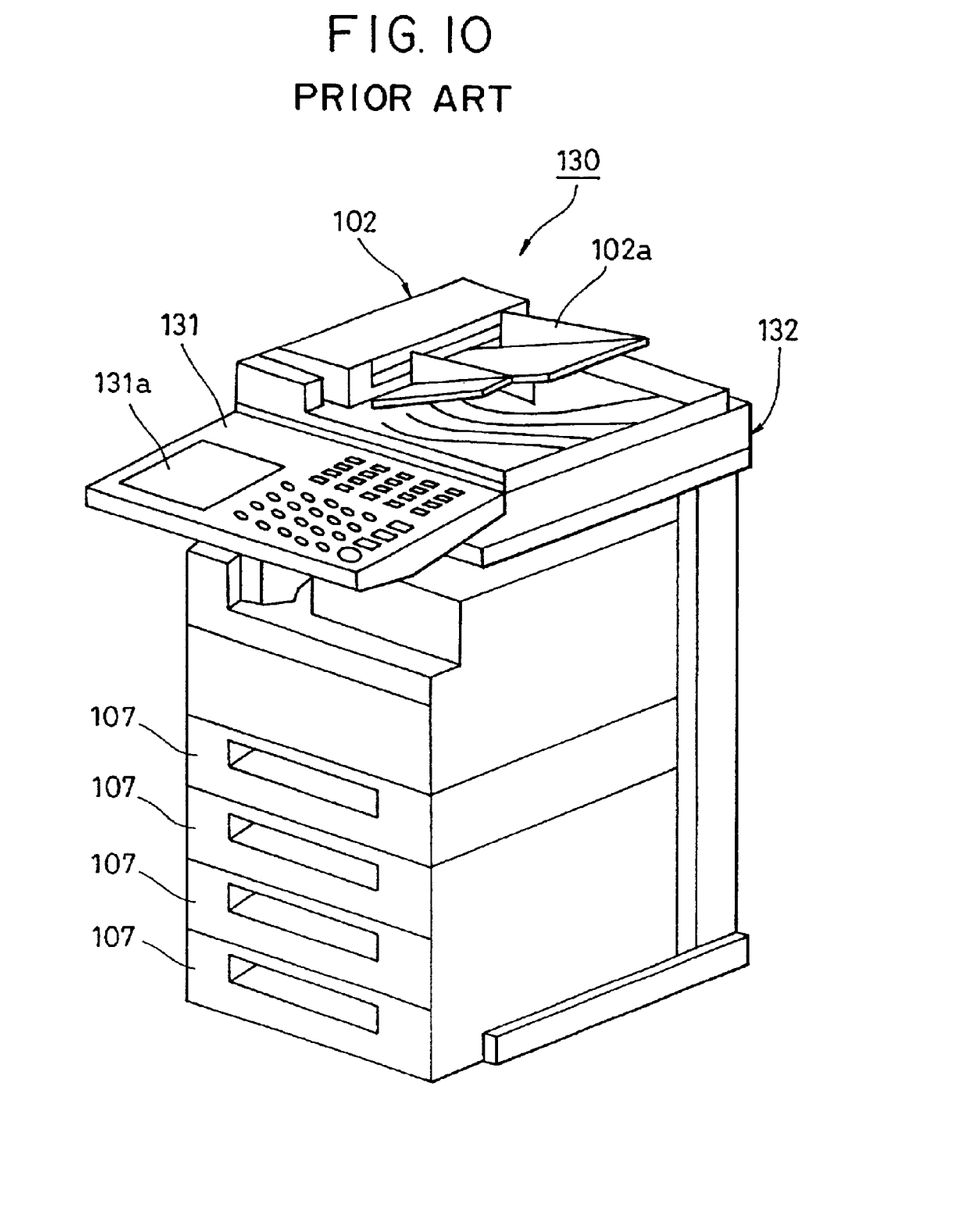
FIG. 10 is a perspective view of another known copying device.

Each of copying devices 120 and 130 shown in FIGS. 9 and 10, respectively, is provided with sheet cassettes 107 which can be drawn from the main body 101. The copying device 120 is provided with a cover 104 for opening and closing the main body 101. The automatic document-feeder 102 is provided with a mounting part 102a for setting original sheets thereon.

The copying devices 120 and 130 are provided with control panels 121 and 131, respectively, and displays 121a and 131a, respectively, which are positioned at the respective front sides of the automatic document feeders 102. Since the control panel 121 or 131 is positioned at the front side, the control panel 121 or 131 interferes with the opening and closing of the automatic document-feeder 102. Therefore, the display 121a of the control panel 121 must be moved or the angle of inclination of the control panel 131 must be changed each time the automatic document-feeder 102 is opened or closed.

Moreover, it is difficult to position the automatic document-feeder 102 further toward the front side, and it is necessary to form a space around a main body 122 or 132 of the copying device 120 or 130, respectively, in which the display 121a or the control panel 131, respectively, can move. That is, there is a drawback in that the space around the copying device 120 or 130 is inefficiently used, because, when the device is operated, a larger operational space is required in addition to the space which is occupied by the copying device 120 or 130 when it is operated.

SUMMARY OF THE INVENTION

Accordingly, it is an object of the present invention to provide an image-forming device including an independent control panel provided with a display function, in which an installation space of the device, including an operational space of a main body of the image-forming device, is minimized.

It is another object of the present invention to provide an image-forming device including an independent control panel, in which the control panel is easily accessible by an operator, and in particular, an operator confined to a wheelchair, without requiring excessive reach to the control panel, when the operator operates the control panel at the front side of the image-forming device.

To these ends, according to an aspect of the present invention, an image-forming device comprises a main body; a protrusion extending from a side surface of the main body; a support member provided either on the protrusion or on the protrusion and the main body; and a control panel including a display. The control panel is separate from the main body and supported by the support member toward a front side of the protrusion.

The support member of the image-forming device according to the present invention may extend above the protrusion from a rear side of the protrusion toward the front side thereof and support the control panel at the extended distal end of the support member.

The control panel of the image-forming device according to the present invention may be supported by the supporting member such that the control panel is capable of pivoting, rotating or turning in at least one of a vertical direction and a horizontal direction, by any arbitrary angle.

The protrusion of the image-forming device according to the present invention may include a control member which provides control in connection with at least one operation/function of the control panel, such as copy start, copy count, and the like.

The control member of the image-forming device according to the present invention may be provided at the front side of the protrusion.

The protrusion of the image-forming device according to the present invention may comprise a tray for stacking original sheets or sheets for printing images to be supplied to or discharged from the main body.

The protrusion of the image-forming device according to the present invention may comprise a mounting table for receiving thereon or therein operation manuals.

The control panel of the image-forming device according to the present invention is separate from the main body and supported by the support member toward the front side of the protrusion, where the support member is provided either on the protrusion or on the protrusion and the main body, whereby the maneuverability, accessibility and visibility of the control panel is improved.

The control panel of the image-forming device according to the present invention is supported and is disposed using a protrusion which is necessary for operation of the image-forming device. Therefore, it is not necessary to provide an additional exclusive mounting space, whereby the size of the image-forming device can be reduced.

Since the control panel does not protrude significantly from the front face of the main body, the image-forming device can be reduced in size and the space necessary for operation can be reduced to a minimum, whereby the image-forming device can be installed in a more compact space.

Further objects, features and advantages of the present invention will become apparent from the following description of the preferred embodiments with reference to the attached drawings.

DESCRIPTION OF THE PREFERRED EMBODIMENTS

A copying device as an image-forming device having an independent control panel, according to embodiments of the present invention, is described below with reference to the drawings. The present invention is not limited to a copying device, and can be applied to a facsimile, a printer, a combination of a facsimile and a printer, and the like.

First Embodiment

Figure 1:
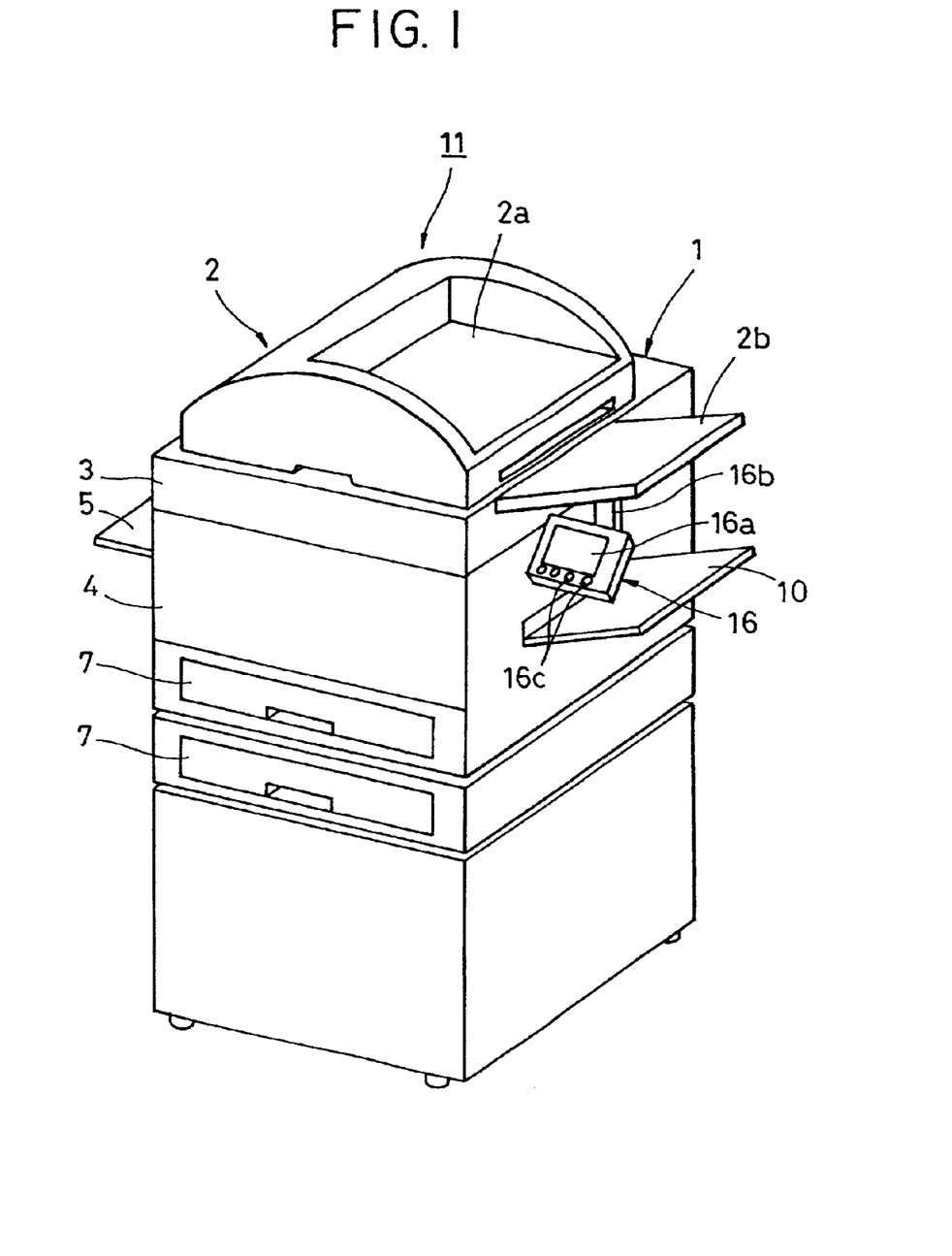
FIG. 1 is a perspective view of a copying device as an image-forming device according to a first embodiment of the present invention.
Figure 2:
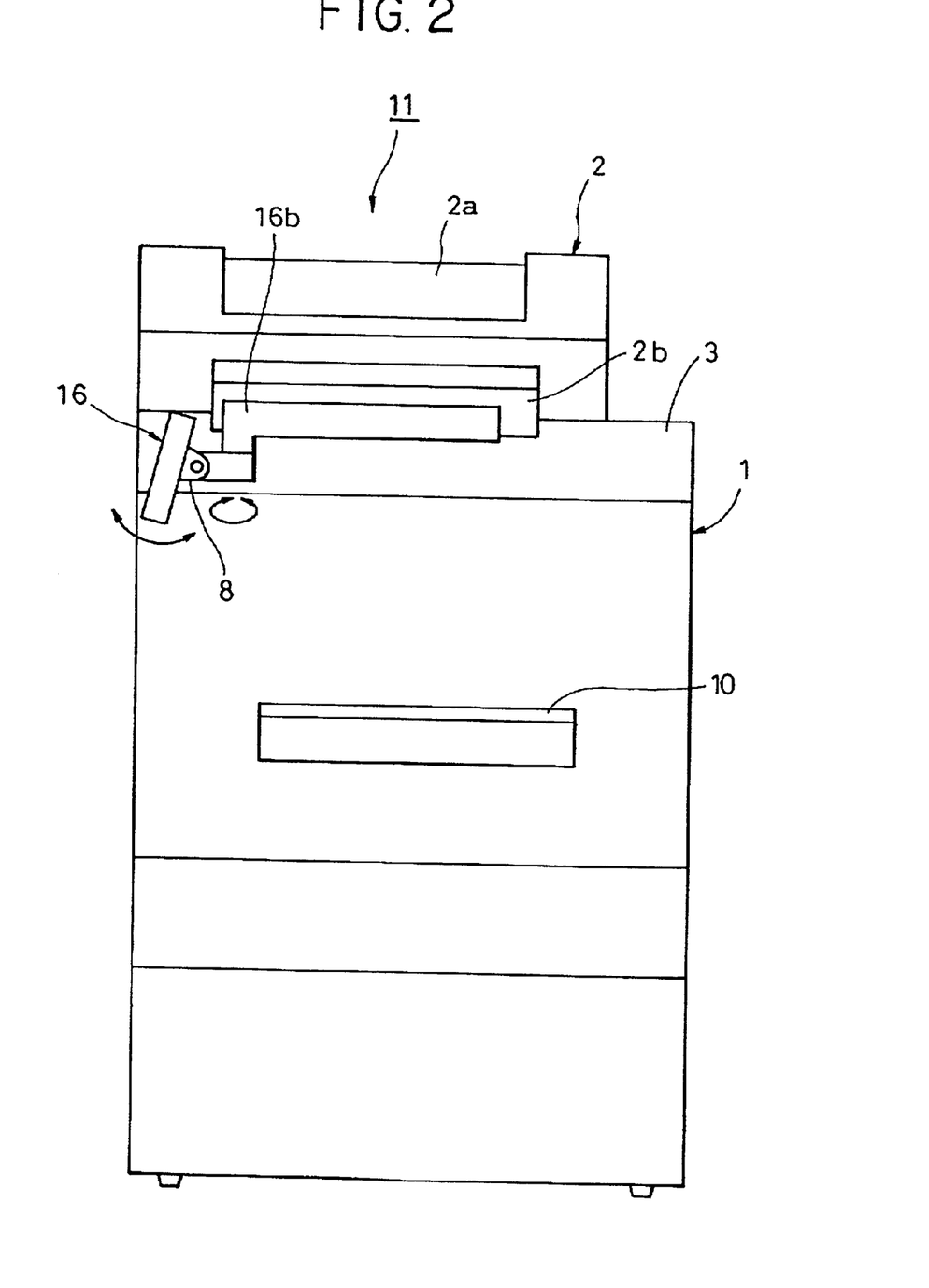
FIG. 2 is a side view of the copying device shown in FIG. 1, illustrating the original-sheet discharge tray.

In FIGS. 1 and 2, a copying device 11 according to a first embodiment of the present invention is provided with an automatic document-feeder 2, which automatically supplies original sheets to an image reader 3, at an upper part of a main body 1 of the copying device 11. The automatic document-feeder 2 includes a mounting part 2a on which the original sheets or books are set. The image reader 3, which optically reads original sheets or books, is provided at an uppermost part of the main body 1, where the uppermost part opposes the lower face of the automatic document-feeder 2.

The automatic document-feeder 2 can pivot on hinges disposed at the rear side thereof. This allow the automatic document-feeder 2 to be maintained open at any desired angle with respect to the main body 1, so that an original sheet or a book can be set on the image reader 3 for reading.

An original-sheet discharge-tray (a protrusion) 2b for stacking original sheets, which have been read and discharged by the automatic document-feeder 2, protrudes from the right side of the upper part of the main body 1.

A sheet-supply tray 5 for stacking sheets for printing, when the sheets are manually supplied to the main body 1 by an operator, protrudes from the left side of the main body 1.

When the operator operates a control panel 16 from a display 16a, including a touch panel and operation buttons 16c, the image reader 3 reads data from an original sheet or book, an imaging unit (not shown) disposed in the main body 1 transfers an image corresponding to the read data onto a sheet which is supplied from a sheet cassette 7 or the sheet-supply tray 5, and the sheet is discharged to a sheet-discharge tray (a protrusion) 10.

The control panel 16, as a feature of the present invention, including the display 16a and the operation buttons 16c, is provided at a support member 16b which is integrated with the original-sheet discharge-tray 2b and is fixed to the main body 1 of the copying device 11 via the original-sheet discharge-tray 2b. The control panel 16 is positioned at the front side of the original-sheet discharge-tray 2b. As shown in FIG. 2, the control panel 16 is supported by the support member 16b at an end thereof via a universal joint 8 so that the control panel 16 can turn in the vertical and horizontal directions (in directions shown by arrows in FIG. 2).

The control panel 16 is electrically connected to the main body 1 via a cable which extends from a controller (not shown) disposed inside the main body 1 through the support member 16b to the control panel 16.

The control panel 16 of the copying device 11 according to the first embodiment is integrated with the original-sheet discharge-tray 2b and is disposed at the front side of the original-sheet discharge-tray 2b. Because the control panel 16 is separate from the main body 1 of the copying device 11, the automatic document-feeder 2 and the image reader 3 can be disposed at the front side of the main body 1 of the copying device 11. In addition, since the control panel 16 can be disposed in a space at the front side of the original-sheet discharge-tray 2b, the control panel 16 does not significantly protrude from the front face of the main body 1.

Therefore, the operator, even when sitting in a wheelchair, can easily view the control panel 16 of the copying device 11 according to the first embodiment. In addition, the operator can readily reach the control panel 16 without requiring excessive reach.

The copying device 11 according to the first embodiment is designed such that the freedom in the layout of the control panel 16 is increased. The maneuverability of the copying device 11 is improved and the copying device 11 is easily used. The size of the copying device 11 can also be decreased, because the space necessary for operation thereof is minimized. Thus, the space around the copying device 11 can be used more efficiently.

Neither the control panel 16 of the copying device 11 nor the support member 16b which supports the control panel 16 interferes with the opening and closing of the automatic document-feeder or with the opening and closing of a cover 4 provided for accessing the interior of the main body 1. The maneuverability of the copying device 11 is thereby improved and the copying device 11 can be more easily used by an operator. Since the supporting member 16b of the copying device 11 is disposed at the original-sheet discharge-tray 2b, the strength and durability of the original-sheet discharge-tray 2b are also increased.

Second Embodiment

Figure 3:
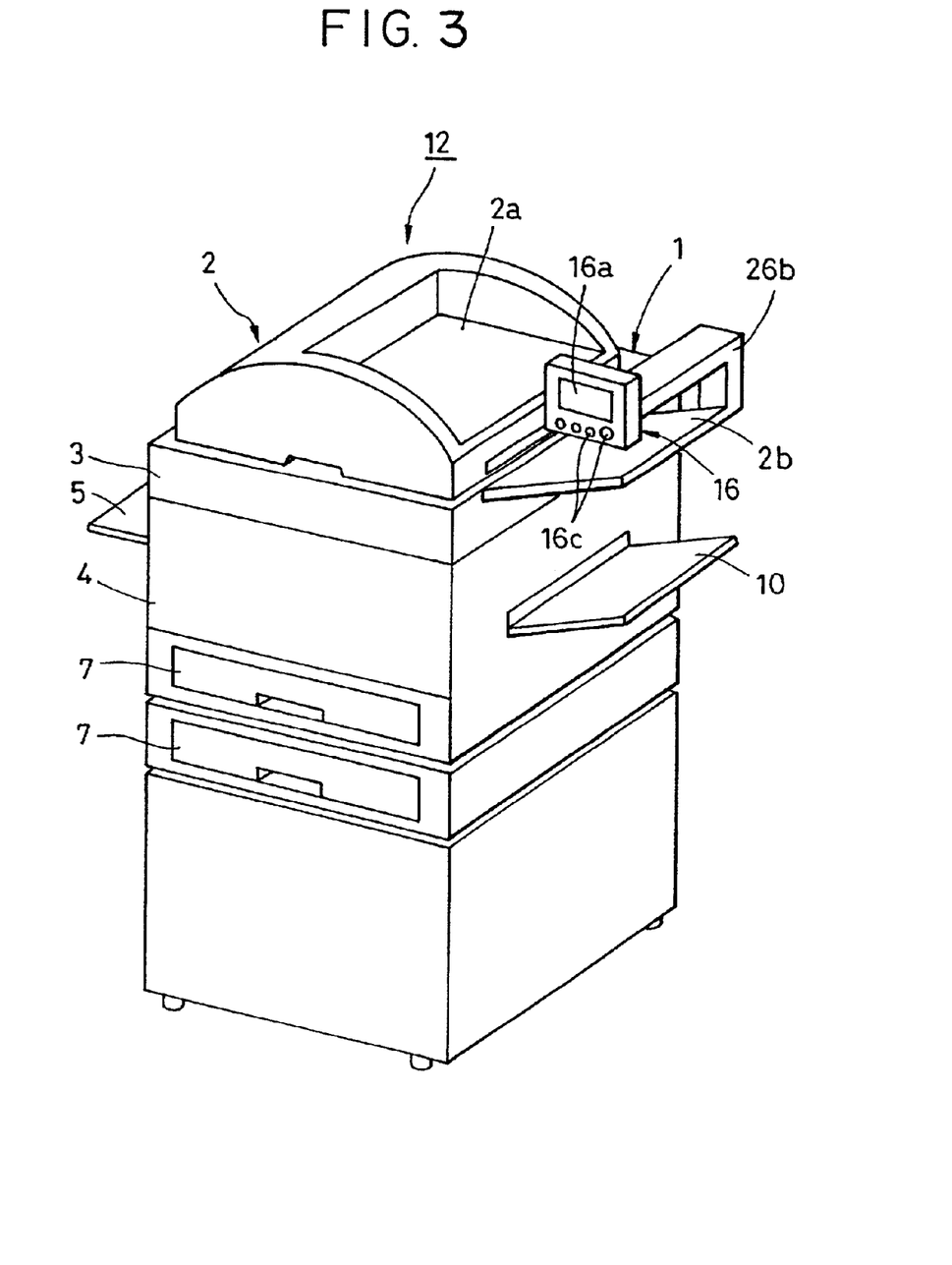
FIG. 3 is a perspective view of a copying device as an image-forming device according to a second embodiment of the present invention.

A copying device 12 shown in FIG. 3 illustrates a second embodiment of the present invention. The copying device 12 is provided with a support member which differs from that of the copying device 11 according to the first embodiment. Components of the copying device 12 other than a support member 26b are the same as those of the copying device 11 according to the first embodiment, and are referred to with the same reference numerals as those used for the copying device 11. Accordingly, description of the corresponding components is omitted here.

A control panel 16, including a display 16a and operation buttons 16c, of the copying device 12 is provided at the support member 26b. The support member 26b is fixed to a main body 1 via an original-sheet discharge-tray (a protrusion) 2b at the rear side of the original-sheet discharge-tray 2b, and extends partly above the original-sheet discharge-tray 2b toward the front side of the original-sheet discharge-tray 2b. The control panel 16 is provided at an end of the support member 26b toward the front side thereof via a joint, similar to the universal joint 8 shown in FIG. 2, such that an operation surface of the control panel 16 can turn in the vertical and horizontal directions. The control panel 16 is positioned toward the front side from the original-sheet discharge-tray 2b.

Original sheets discharged to the original-sheet discharge-tray 2b can be removed from the original-sheet discharge-tray 2b by being drawn out between the original-sheet discharge-tray 2b and the lower parts of the control panel 16 and the support member 26b.

The support member 26b of the copying device 12 is fixed to the main body 1 via the original-sheet discharge-tray tray 2b at one end of the support member 26b toward the rear side of the original-sheet discharge-tray 2b. The support member 26b extends above the original-sheet discharge-tray 2b, and supports the control panel 16 at the other end of the supporting member 26b, whereby the control panel 16 does not interfere with original documents when the original documents are removed; therefore, the original documents can be easily removed.

Since the control panel 16 of the copying device 12 is disposed above the original-sheet discharge-tray 2b, freedom in designing the position of the control panel 16 is provided.

The copying device 12 according to the second embodiment offers the same feature as that of the copying device 11 according to the first embodiment.

Third Embodiment

Figure 4:
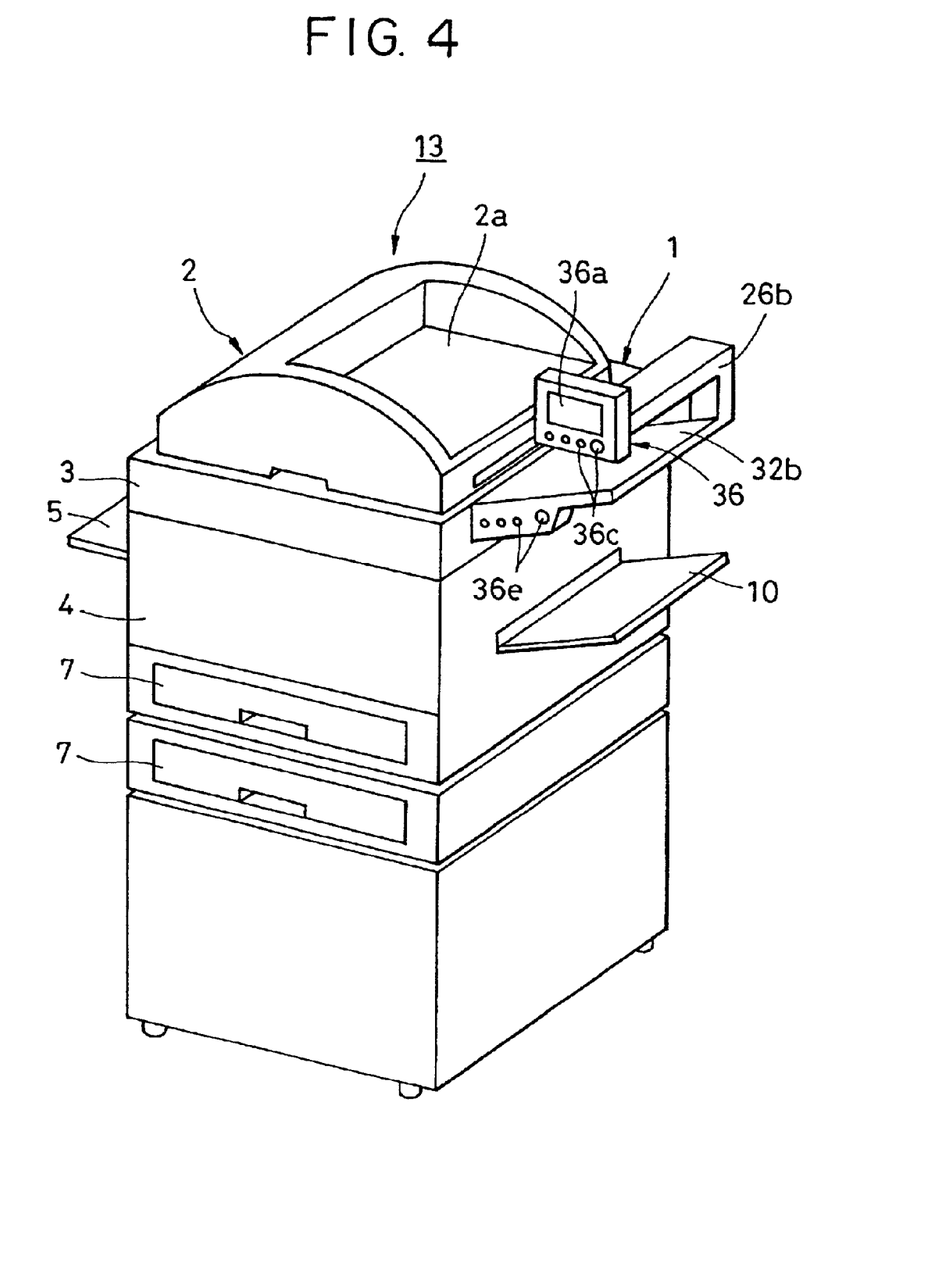
FIG. 4 is a perspective view of a copying device as an image-forming device according to a third embodiment of the present invention.

In FIG. 4, a copying device 13 according to a third embodiment of the present invention is provided with predetermined operation buttons (operation members) 36e, such as a copy-start button and a copy-quantity setting button, which are used frequently, at a front face of an original-sheet discharge-tray (a protrusion) 32b, separate from operation buttons 36c, which are provided on a control panel 36. The predetermined operation buttons 36e may provide/control the same as, a subset of, or different, functions as operation buttons 36c.

Components of the copying device 13 according to the third embodiment other than the original-sheet discharge-tray 32*b* and the control panel 36 are the same as those of the copying device 12 according to the second embodiment, and are referred to with the same reference numerals. Accordingly, description of the corresponding components is omitted here.

The copying device 13 preferably is provided with predetermined operation buttons 36*e* which are used frequently at the front face of the original-sheet discharge-tray 32*b*. Therefore, an operator using a wheelchair can operate the copying device 13 by using the predetermined operation buttons 36*e* positioned at a lower level, whereby the maneuverability and operability of the copying device 13 is further improved. The control panel 36 is connected to the front-side end of a support member 26*b* via a joint (not shown), similar to the universal joint 8 shown in FIG. 2, such that the operation surface of the control panel 36 can turn in the vertical and horizontal directions. The control panel 36 includes a display 36*a*, operations buttons 36*c*, and the like.

The copying device 13 according to the third embodiment offers the same advantages as that of the copying device 11 or 12 according to the first or second embodiment, respectively.

Fourth Embodiment

Figure 5:
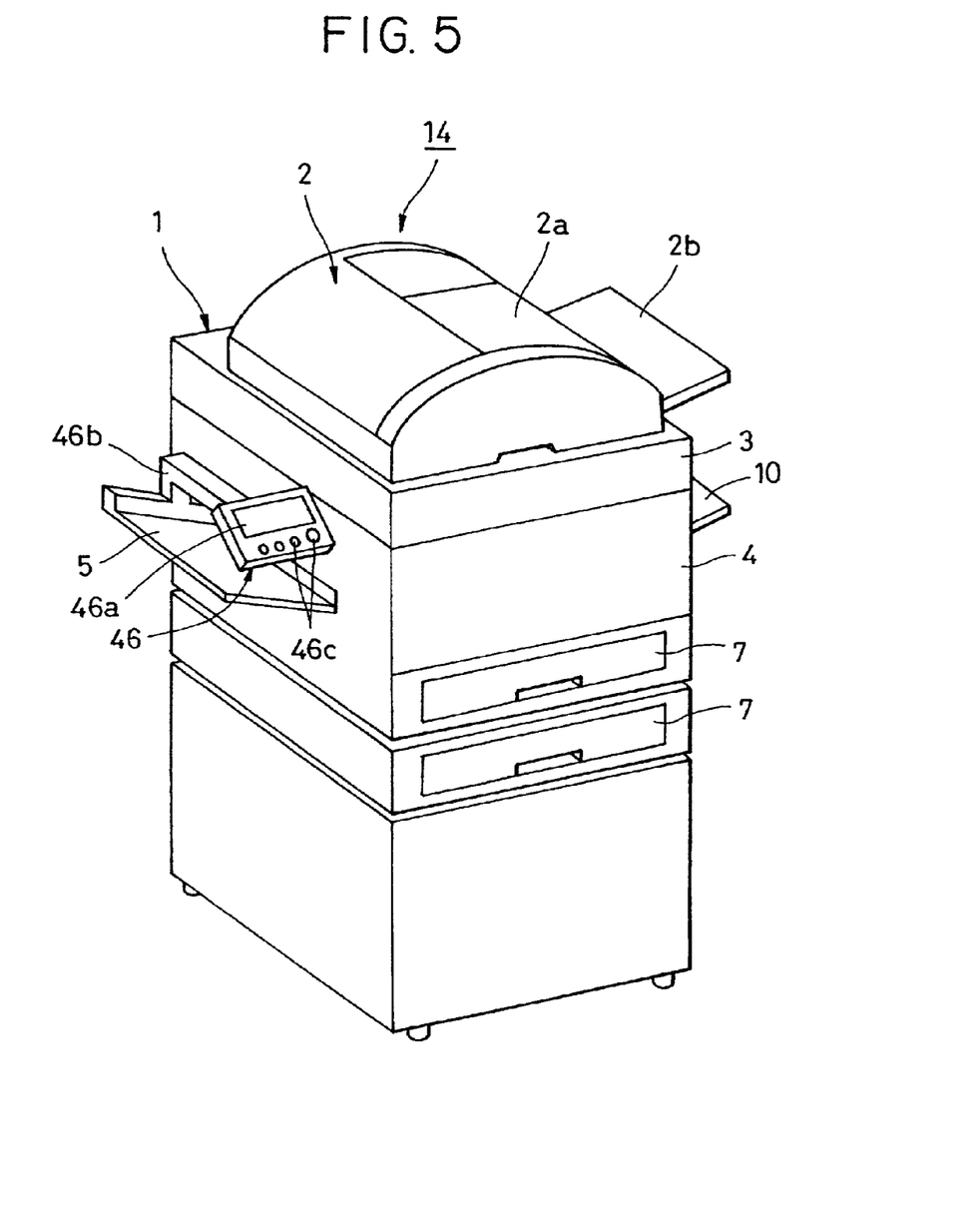
FIG. 5 is a perspective view of a copying device as an image-forming device according to a fourth embodiment of the present invention.

In FIG. 5, a copying device 14 according to a fourth embodiment of the present invention is shown. The copying device 14 differs from the copying device 12 of the second embodiment in that the copying device 14 is provided with a control panel 46 that is disposed at a sheet-supply tray 5 (a protrusion) positioned at the left side of a main body 1 of the copying device 14. Components of the copying device 14 other than the control panel 46 and a support member 46*b* are the same as those of the copying device 12 according to the second embodiment, and are referred to with the same reference numerals. Accordingly, description of the corresponding components is omitted here.

The control panel 46, which includes a display 46*a* and operation buttons 46*c*, of the copying device 14 shown in FIG. 5 is supported by the support member 46*b*. The support member 46*b* is fixed to the main body 1 via the sheet-supply tray 5 at one end of the support member 46*b* toward the rear side of the sheet-supply tray 5, and extends partly above the sheet-supply tray 5 toward the front side. The control panel 46 is connected to the other end of the support member 46*b* toward the front side via a joint (not shown) similar to the universal joint 8 shown in FIG. 2 such that the operation surface of the control panel 46 can turn in the vertical and horizontal directions. The control panel 46 includes the display 46*a*, the operation buttons 46*c*, and the like. The control panel 46 is disposed toward the front side from the sheet-supply tray 5.

Sheets to be stacked on the sheet-supply tray 5 are supplied to the sheet-supply tray 5 by being inserted between the sheet-supply tray 5 and the lower parts of the control panel 46 and the support member 46*b*.

The control panel 46 of the copying device 14 does not interfere with the sheets when the sheets are supplied to the sheet-supply tray 5 because the support member 46*b* is fixed to the main body 1 via the sheet-supply tray 5 at the one end of the support member 46*b* toward the rear side of the sheet-supply tray 5, extends above the sheet-supply tray 5, and supports the control panel 46 at the other end of the support member 46*b*.

Since the control panel 46 of the copying device 14 is disposed above the sheet-supply tray 5, freedom in designing the position of the control panel 46 is provided.

The copying device 14 according to the fourth embodiment offers the same advantages as that of the copying device 11 according to the first embodiment.

Fifth Embodiment

Figure 6:
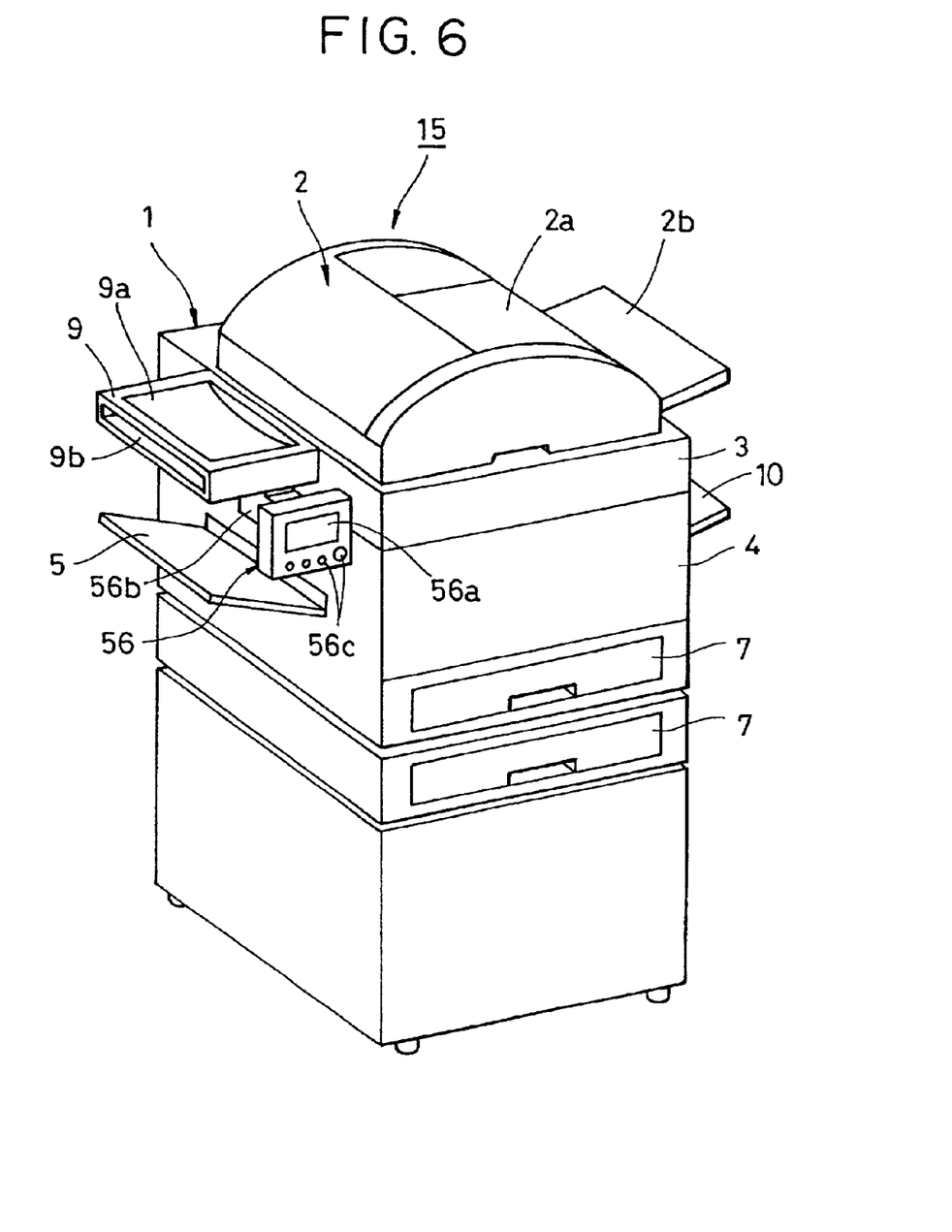
FIG. 6 is a perspective view of a copying device as an image-forming device according to a fifth embodiment of the present invention.

A copying device 15 according to a fifth embodiment of the present invention shown in FIG. 6. The copying device 15 differs from the copying device 11 of the first embodiment in that a control panel 56 of the copying device 15 is supported at a document-mounting table 9 (a protrusion) which is disposed at the left side of a main body 1 of the copying device 15. Components of the copying device 15 other than the control panel 56 and a support member 56*b* are the same as those of the copying device 11, and are referred to with the same reference numerals. Accordingly, description of the corresponding components is omitted here.

The document-mounting table 9 of the copying device 15 shown in FIG. 6 is provided with a mounting part 9*a*, on which the operator can place documents, stationery and office supplies such as paper clips, and a storage case 9*b* for storing items such as an operation manual, service history documents, or the like. The control panel is supported by the support member 56*b* and is provided with a display 56*a* and operation buttons 56*c*.

The support member 56*b* is fixed to the main body 1 via the document-mounting table 9. One end of the support member 56*b* fixed to the lower side of the document-mounting table 9. The support member 56*b* extends toward the front side of the main body 1. The control panel 56 is connected to the other end of the support member 56*b* toward the front side via a joint (not shown), similar to the universal joint 8 shown in FIG. 2, such that the operation surface of the control panel 56 can turn in the vertical and horizontal directions. The control panel 56 is positioned toward the front side of the document-mounting table 9.

The control panel 56 does not interfere with access to documents or office supply items, such as paper clips, placed on the mounting part 9*a* for a while; therefore, the space above the control panel 56 can be efficiently used. An operation manual, service history documents, or the like can be stored in the storage case 9*b* without the control panel 56 interfering with access to the operation manual, the service history documents, or the like.

The support member 56*b* of the copying device 15 is fixed to the main body 1 of the copying device 15 via the document-mounting table 9 at the lower side of the document-mounting table 9 and supports the control panel 56 at an end of the support member 56*b*. In addition, the control panel 56 does not interfere with an operator when placing documents or office supply items, such as paper clips, on the mounting part 9*a* or storing the operation manual, the service history documents, or the like in the storage case 9*b*.

Although in the copying device 11, 12, 13, or 14 according to the first, second, third, or fourth embodiment, respectively, the support member 16*b*, 26*b*, 26*b*, or 46*b*, respectively, is integrated with the original-sheet discharge-tray 2*b*, 2*b*, or 32*b*, or the sheet-supply tray 5, respectively, the support member 16*b*, 26*b*, 26*b*, or 46*b* may span the main body 1 and the original-sheet discharge-tray 2*b*, 2*b*, or 32*b*, or the sheet-supply tray 5, respectively. In this case, the strength of the original-sheet discharge-tray 2*b* or 32*b* or the sheet-supply tray 5 can be increased.

The support member 16*b*, 26*b*, 26*b*, or 46*b* may be integrated with a sheet-discharge tray 10 which protrudes from the main body 1 in the same way as the original-sheet discharge-tray 2*b*, or 32*b* or the sheet-supply tray 5. The support member 16*b*, 26*b*, 26*b*, or 46*b* may span the sheet-discharge tray 10 and the main body 1. In this case, the sheet-discharge tray 10 can be reinforced.

When each of the control panels 36 and 46, according to the third and fourth embodiments, respectively, is disposed at the sheet-supply tray 5 or the sheet-discharge tray 10, the control panel 36 or 46 can be positioned at a lower level. In this case, an operator using a wheelchair can access the main body 1 more easily, and the control panel 36 or 46 can be viewed and operated more easily.

Although the support member 16b, 26b, 26b, 46b, or 56b of the copying device 11, 12, 13, 14, or 15, respectively, according to the first, second, third, fourth, or fifth embodiment, respectively, is supported by a protrusion such as the original-sheet discharge-tray 2b, 2b, or 32b, the sheet-supply tray 5, or the document-mounting table 91 the protrusion is not limited to the original-sheet discharge-trays 2b, 2b, and 32b, the sheet-supply tray 5, and the document-mounting table 9. Any protrusion may be used as long as it has a function directly or indirectly related to the operation of the main body 1 and protrudes from a side surface of the main body 1. In a copying device which is provided with an electronic unit such as a card reader for inputting to and outputting from a magnetic card, which often is used for controlling individual copy-quantity, the protrusion may be a tray which receives the card, another tray for receiving the discharged card, or the like.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-forming device comprising:
  a control panel, having a display function, provided externally of a main body of the image-forming device;
  a protrusion, necessary for operation of the image-forming device, protruding outwardly from a side surface of the main body; and
  a supporting member provided either on the protrusion or on the side surface of the main body and the protrusion, the supporting member supporting the control panel at a location separated from the main body toward a front side of the protrusion.

2. An image-forming device according to claim 1, wherein the supporting member extends above the protrusion from a rear side of the protrusion toward the front side thereof and supports the control panel at the extended end of the supporting member.

3. An image-forming device according to one of claims 1 and 2, wherein the control panel is supported by the supporting member such that the control panel is capable of turning in vertical and horizontal directions by an arbitrary angle.

4. An image-forming device according to claim 1, wherein the protrusion includes a control member which is provided with at least one part of the function of the control panel.

5. An image-forming device according to claim 4, wherein the control member, which the protrusion includes, is provided at the front side of the protrusion.

6. An image-forming device according to claim 4, wherein the supporting member extends above the protrusion from a rear side of the protrusion toward the front side thereof and supports the control panel at the extended end of the supporting member.

7. An image-forming device according to one of claims 4 to 6, wherein the control panel is supported by the supporting member such that the control panel is capable of turning in vertical and horizontal directions by an arbitrary angle.

8. An image-forming device according to claim 1, wherein the protrusion comprises a tray for stacking original sheets or sheets for printing images to be supplied to or discharged from the main body.

9. An image-fanning device according to claim 8, wherein the supporting member extends above the tray from a rear side of the tray toward the front side thereof and supports the control panel at the extended end of the supporting member.

10. An image-forming device according to one of claims 8 and 9, wherein the control panel is supported by the supporting member such that the control panel is capable of turning in vertical and horizontal directions by an arbitrary angle.

11. An image-forming device according to claim 4, wherein the protrusion comprises a tray for stacking original sheets or sheets for printing images to be supplied to or discharged from the main body.

12. An image-forming device according to claim 11, wherein the control member, which the tray includes, is provided at the front side of the tray.

13. An image-forming device according to claim 11, wherein the supporting member extends above the tray from a rear side of the tray toward the front side thereof and supports the control panel at the extended end of the supporting member.

14. An image-forming device according to one of claims 11 and 13, wherein the control panel is supported by the supporting member such that the control panel is capable of turning in vertical and horizontal directions by an arbitrary angle.

15. An image-forming device according to claim 1, wherein the protrusion comprises a mounting table for receiving thereon or therein operation manuals.

16. An image-forming device according to claim 15, wherein the supporting member extends above the mounting table from a rear side of the mounting table toward the front side thereof and supports the control panel at the extended end of the supporting member.

17. An image-forming device according to one of claims 15 and 16, wherein the control panel is supported by the supporting member such that the control panel is capable of turning in vertical and horizontal directions by an arbitrary angle.

18. An image-forming device according to claim 4, wherein the protrusion comprises a mounting table for receiving thereon or therein operation manuals.

19. An image-forming device according to claim 18, wherein the control member, which the mounting table includes, is provided at the front side of the protrusion.

20. An image-forming device according to claim 18, wherein the supporting member extends above the protrusion from a rear side of the protrusion toward the front side thereof and supports the control panel at the extended end of the supporting member.

21. An image-forming device according to one of claims 18 to 20, wherein the control panel is supported by the supporting member such that the control panel is capable of turning in vertical and horizontal directions by an arbitrary angle.

* * * * *

UNITED STATES PATENT AND TRADEMARK OFFICE
CERTIFICATE OF CORRECTION

PATENT NO. : 6,795,662 B2
DATED : September 21, 2004
INVENTOR(S) : Kudo

It is certified that error appears in the above-identified patent and that said Letters Patent is hereby corrected as shown below:

Column 2,
Line 41, "is" should read -- are --.

Column 4,
Line 3, "is" should read -- are --.

Column 6,
Line 39, "tray" (second occurrence) should be deleted.

Column 9,
Line 13, "table 91" should read -- table 9, --.

Column 10,
Line 10, "image-fanning" should read -- image-forming --.

Signed and Sealed this

Twenty-sixth Day of July, 2005

JON W. DUDAS
*Director of the United States Patent and Trademark Office*